O. C. RALSTON.
PROCESS OF MAKING ANHYDROUS ANTIMONY TRICHLORID.
APPLICATION FILED AUG. 10, 1920.

1,384,918. Patented July 19, 1921.

Inventor,
Oliver C. Ralston.
by Byrnes Townsend & Bieistein,
Attorneys

UNITED STATES PATENT OFFICE.

OLIVER C. RALSTON, OF NIAGARA FALLS, NEW YORK, ASSIGNOR TO HOOKER ELECTROCHEMICAL COMPANY, OF NEW YORK, N. Y., A CORPORATION OF NEW YORK.

PROCESS OF MAKING ANHYDROUS ANTIMONY TRICHLORID.

1,384,918.  Specification of Letters Patent.  Patented July 19, 1921.

Application filed August 10, 1920. Serial No. 402,621.

*To all whom it may concern:*

Be it known that I, OLIVER C. RALSTON, a citizen of the United States, residing at Niagara Falls, in the county of Niagara and State of New York, have invented certain new and useful Improvements in Processes of Making Anhydrous Antimony Trichlorid, of which the following is a specification.

This invention is a novel process for the manufacture of anhydrous antimony trichlorid by direct reaction between metallic antimony and chlorin. According to the invention the antimony metal is submerged beneath a bath of molten anhydrous antimony trichlorid, which serves to regulate and control the operation, chlorin being introduced into reactive contact with the metal at a rate sufficient to maintain, through exothermic reaction, the temperature at the particular point desired. This temperature may at will be sufficient to effect the continuous distillation of the anhydrous chlorid (boiling point 223° C.) at substantially the rate at which it is formed; or, preferably, it may be maintained above the melting point of the anhydrous chlorid (melting point 72.8° C.) which is then withdrawn continuously in liquid phase and submitted to a separate distillation for refining purposes. The operation under these conditions is subject to easy and accurate control, and by reason of this fact and by reason of the constant presence of antimony metal in excess, a product wholly free from the objectionable antimony pentachlorid may be continuously prepared.

Figure 1:
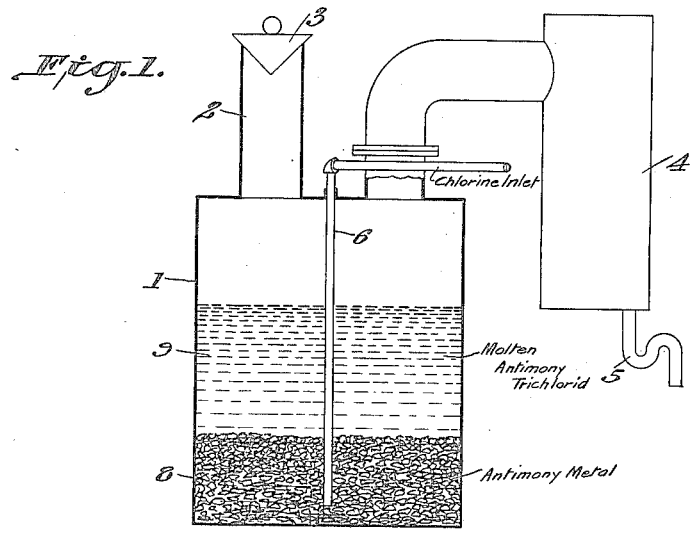
Figure 2:
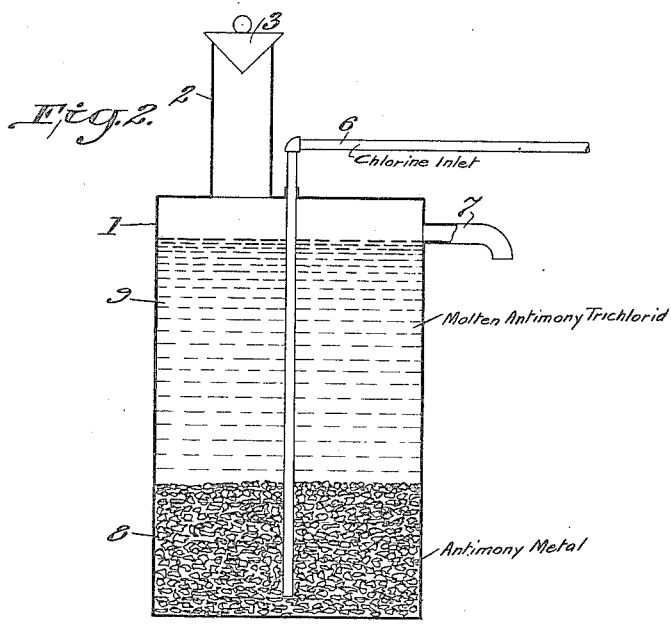

The accompanying drawings illustrate diagrammatically two forms of apparatus adapted for the operation, Figure 1 being a vertical central section of a type of apparatus permitting continuous distillation of the product; and Fig. 2 a similar view of a type of apparatus permitting recovery of the product in liquid phase.

In said drawings, in which like numerals are applied to similar parts in the two figures, 1 represents a reactor which may be constructed of or lined with lead or other metal or material not affected by antimony trichlorid or chlorin under anhydrous conditions. 2 is a charging inlet provided with a tight closure 3, and 4 (Fig. 1) is a condenser for the vapors of antimony trichlorid, this condenser being preferably maintained above the melting point of the anhydrous salt to permit its continuous withdrawal through a trapped or sealed outlet 5. 6 represents the chlorin inlet, which may be of fused silica ware or other material capable of withstanding both the temperatures and the reagents. 7 (Fig. 2) represents a continuous overflow for the molten salt. In both figures the antimony in the form of crushed metal is represented at 8, and the bath of molten trichlorid at 9.

The operation in the two cases is substantially similar, except that in the use of the apparatus shown in Fig. 1 the molten bath 8 is maintained, by the exothermic reaction due to the chlorin supply, supplemented if desired by heat applied from external sources, at the distilling point; while in the use of the apparatus of Fig. 2 the temperature is similarly maintained between the melting and distilling points of the trichlorid. In both cases the volume of the bath in a continuous operation is maintained approximately constant, and sufficient crushed metal is supplied, continuously or at intervals, to insure its presence in excess throughout the entire duration of the operation. It will be understood however that the particular apparatus illustrated constitutes no part of the present invention and may be variously modified.

I claim:—

1. Process of making anhydrous antimony trichlorid consisting in reacting with gaseous chlorin upon antimony metal submerged beneath a molten bath of anhydrous antimony trichlorid.

2. A continuous process of making antimony trichlorid consisting in reacting with gaseous chlorin upon antimony metal submerged beneath a molten bath of anhydrous antimony trichlorid, supplying additional quantities of metal to the bath at a rate sufficient to maintain an excess of metal therein at all times, and withdrawing from the system in unit time a quantity of antimony trichlorid substantially equal to that produced by the reaction, whereby a product free from antimony pentachlorid is obtained and the volume of the molten bath is kept approximately constant.

3. Process according to claim 1 wherein the chlorin is supplied at a sufficient rate to maintain the bath in molten state through exothermic reaction with the antimony.

In testimony whereof I affix my signature.

OLIVER C. RALSTON.